(12) United States Patent
Sukhman et al.

(10) Patent No.: US 6,983,001 B2
(45) Date of Patent: Jan. 3, 2006

(54) LASER WITH HEAT TRANSFER SYSTEM

(75) Inventors: Yefim P. Sukhman, Scottsdale, AZ (US); Christian J. Risser, Scottsdale, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 298 days.

(21) Appl. No.: 10/320,772

(22) Filed: Dec. 16, 2002

(65) Prior Publication Data

US 2004/0114647 A1 Jun. 17, 2004

(51) Int. Cl.
*H01S 3/04* (2006.01)

(52) U.S. Cl. ............................. 372/34; 372/35; 372/55; 372/66; 372/83

(58) Field of Classification Search .................... 372/34, 372/35, 55, 83
See application file for complete search history.

(56) References Cited

U.S. PATENT DOCUMENTS

| 4,719,639 | A | * | 1/1988 | Tulip ............................ 372/66 |
| 4,787,090 | A | | 11/1988 | Newman et al. |
| 5,661,746 | A | * | 8/1997 | Sukhman et al. ............. 372/83 |
| 5,714,214 | A | * | 2/1998 | Larsen ......................... 428/34 |
| 6,195,379 | B1 | | 2/2001 | Jones et al. |
| 6,198,758 | B1 | | 3/2001 | Broderick et al. |

* cited by examiner

*Primary Examiner*—Minsun Oh Harvey
*Assistant Examiner*—Dung (Michael) T. Nguyen
(74) *Attorney, Agent, or Firm*—Perkins Coie LLP

(57) ABSTRACT

A laser includes a deformable tube holding an electrode assembly that includes conformable spacers. The spacers are deformed by compression of the tube into good surface contact with the electrodes and the tube walls, thereby providing the necessary path for heat removal from the plasma in order to maintain the required operating temperature for adequate performance of the laser.

36 Claims, 5 Drawing Sheets

LASER WITH HEAT TRANSFER SYSTEM

FIELD OF THE INVENTION

This invention relates to systems and apparatus for cooling a lasing medium in gas lasers.

BACKGROUND OF THE INVENTION

Gas temperature is one of the main factors in determining the output power obtainable from a gas laser. Therefore, management of the heat generated during laser operation is critical to overall performance. In sealed off, RF excited carbon dioxide lasers, for example, electrodes are used to excite the gas plasma. These electrodes are traditionally made from metal such as aluminum and are spaced apart so as to form a gap therebetween in which the gas is excited to form the plasma. The metal electrodes are consequently in contact with the plasma and conduct heat from the plasma in an efficient manner. This heat must then be removed from the electrodes in order to maintain a desired operating temperature.

Cooling the electrodes can be accomplished by several methods. One method is to directly pump liquid through the electrodes. Another method is to conduct the heat from the electrodes through the walls of the tube and then dissipate the heat outside of the tube, for example by air cooling or liquid cooling. Each method has its advantages and disadvantages.

Thus, liquid cooling of the electrodes using the first method is the most efficient method, but it requires complicated seals and additional passageways to direct the liquid into and out of the sealed tube. The electrodes tend to be more complicated as well, in order to accommodate the liquid cooling.

Conducting the heat from the electrodes through the walls of the tube using the second method is usually less complicated and expensive. However, this approach requires that the heat be transferred through a layer of dielectric material surrounding the electrodes, because the electrodes are under electric potential and cannot therefore be in direct contact with the walls of the tube. This reduces the heat transfer efficiency.

Because of its lesser cost, the second method is the preferred approach for lower cost lasers.

Low power lasers can employ a small gap between the electrodes and the walls of the tubes. This gap, which is occupied by the laser gas mixture, serves the same function as a layer of dielectric material in electrically insulating the electrodes, while the gas transfers the heat across the gap. However, as power increases, the heat load increases and this method becomes impractical due to the poor thermal conductivity of gases.

For high power lasers, solid dielectric materials with good thermal conductivity, such as alumina ceramic, are employed. The dielectric material is sandwiched between each electrode and the walls of the tube. One example of a conventional laser with such a heat transfer system is described in U.S. Pat. No. 6,198,758, the disclosure of which is incorporated herein by reference.

An improved construction is described in U.S. Pat. No. 5,661,746, which illustrates in FIGS. 13–15 therein the use of anodized aluminum (aluminum oxide coated) spacers to insulate the electrodes from the walls of the tube while maintaining good thermal conductivity.

However, there have been a number of difficulties that need to be overcome when implementing a design using solid dielectric insulators to conduct heat from the electrodes.

First, all of the components, including the electrodes, tube walls and the dielectric layers, have had smooth, flat surfaces in order to maximize contact between the components for optimal heat transfer. Tubes for sealed gas lasers are usually extruded, and extrusions tend to have a certain amount of surface distortion, making it difficult to obtain flat internal surfaces. Electrodes are also sometimes extruded, leading to the same problem. Machining the electrodes to obtain flat surfaces is expensive, and machining the inside surfaces of the walls of the tubes is very difficult.

Because the tube walls cannot easily be machined flat, they must be made thin, so that they will deform when the tube is compressed against the assembly of dielectric material and electrodes in order to optimize the contact area. When all or most of the walls are thin, the tube is mechanically weak, which can cause the resonator optical elements to come out of alignment if the resonator optical elements are attached directly to the tube.

In addition, dielectric materials tend to be brittle and are liable to crack when deformed. As a result, in order to compensate for the lack of flat, smooth surfaces and to prevent the dielectric material from cracking under pressure, many smaller pieces of dielectric material have been used instead of fewer larger pieces, but this leads to complexity in assembly and added cost.

One further problem arises from the fact that the electrodes and dielectrics must be held in place in the tube to prevent the electrodes from making contact with the walls of the tube. Pockets can be machined into the electrodes to contain the dielectric material, but it is difficult to machine pockets on the inner walls of the tube. Consequently, other methods must be employed to prevent the electrodes from shifting laterally and touching the walls.

In an attempt to address some of these problems, it has been proposed to make the laser tube that holds the electrodes deformable. Two designs for deformable laser tubes are known, but while each one addresses the problem of providing surface contact for satisfactory heat transfer, each still has drawbacks that need to be overcome.

The first design is disclosed in U.S. Pat. No. 4,787,090, which proposes an extruded tube (11 in FIG. 1 of the patent) with a U-shaped structure (20, 21 and 22 in FIG. 1) on one wall connected to the rest of the tube by thin walls (18 and 19 in FIG. 1). The thin walls allow the tube to deform, bringing the U-shaped structure into contact with the electrode assembly. To achieve this, the electrode assembly is inserted into the tube and then a separate part or top (31 in FIG. 2 of the patent) is bolted to the tube in such a way that it applies force to the deformable thin walls of the tube, compressing the electrode assembly to provide surface contact for heat transfer.

This design has a number of drawbacks. First, the design is complicated by the fact that the provision for compressing the tube is not built into the tube itself, but rather requires the separate top 31 to be attached to the tube.

Another drawback is that the electrode assembly is compressed by vertical members (20 and 21 in FIG. 1), which contact only a small portion of one face of the electrode assembly. The intermediate portion of the tube wall (22 in FIG. 1) does not contact the electrode assembly. However, on the opposite face of the electrode assembly, the tube wall (15 in FIG. 1) contacts the entire facing surface of the electrode assembly. This results in asymmetrical cooling that can cause the tube to deform, which can affect beam quality and resonator alignment if the optical elements are mounted directly to the tube.

The second design for a deformable tube is described in U.S. Pat. No. 6,195,379, which proposes a rectangular extruded tube (44 in FIG. 10 of the patent) with thin walls squeezing the electrode assembly and providing the compressive force for surface contact to facilitate heat transfer.

This second design also suffers from drawbacks. The extruded tube does not provide a means for capturing the electrode assembly and preventing it from shifting laterally other than the friction from the compressive force. Friction is not a reliable means to laterally locate the electrodes in the tube and keep them aligned with the optics, or to prevent them from contacting the walls of the tube and causing an electrical short circuit.

This design also relies on the elastic deformation, temper and material strength of the tube to compress the electrode assembly. This restricts the materials from which the tube can be manufactured.

As mentioned earlier, the inside dimensions of the tube in its relaxed state must be smaller than the electrode assembly for this design to work. However, if the walls of the tube were straight when in their relaxed state, they would have a natural tendency to form an arch when compressed around the electrode assembly, making good surface contact difficult to maintain. To compensate for this, the tube walls must be fabricated with a predetermined inward curve in their relaxed state in order that they rest flat against the electrode assembly. This makes manufacturing the tube more complicated and expensive, and control of this curvature is difficult to maintain using an extrusion process.

It is noted that gas lasers are usually filled to a pressure significantly less than atmospheric pressure. Yet another drawback arises from the fact that this second design relies on the difference in pressure between the atmosphere and the gas mixture and the resulting compressive force on the tube walls to help squeeze the electrode assembly. However, this means that laser performance depends on the outside atmospheric pressure. Accordingly, the laser may not be suitable for high altitude or space applications.

This design also requires that both sides of the tube deform, making it difficult to maintain accurate registration between the resonator optical elements if attached to the ends of the tube and the electrode assembly inside.

Finally, special tooling is required to assemble the tube.

Accordingly, there remains a need for a laser structure that enables efficient and symmetric heat transfer, reliable construction and efficient manufacturing techniques.

SUMMARY OF THE INVENTION

It is therefore an object of the present invention to provide a laser with a heat transfer system that avoids the above-described difficulties of the prior art.

The above and other objects are achieved by the present invention which, in one embodiment, is directed to a laser comprising a housing having a housing cavity therein, first and second electrodes in the housing cavity defining a lasing volume therebetween, and a lasing medium in the lasing volume. The laser further comprises at least one heat conducting, electrically insulating spacer in the housing cavity including a first spacer and at least one conformable spacer in the housing cavity including a second spacer, the first and second spacers being positioned in the housing cavity to separate the first electrode from the housing.

As a result of this structure, during operation of the laser, heat is conducted from the lasing medium through the first electrode and the first and second spacers to the housing cavity to maintain an acceptable operating temperature of the lasing medium.

Advantageously, another heat conducting and electrically insulating spacer may be provided to sandwich the conformable spacer between the two insulating spacers.

Each of the conformable spacers is advantageously deformable upon compression of the housing to bring its surfaces into contact with adjacent surfaces, so that, for example, the conformable spacer is deformed to bring one of its surfaces into contact with the insulating spacer and an opposing surface into contact with the housing.

A corresponding arrangement of spacers may be advantageously provided for the second electrode.

The present invention is also directed towards methods for making the lasers.

These and other objects, features and advantages of the present invention will be apparent from the following detailed description of the preferred embodiments taken in conjunction with the following drawings, wherein like reference numerals denote like elements.

DETAILED DESCRIPTION OF THE PREFERRED EMBODIMENTS

Figure 1:
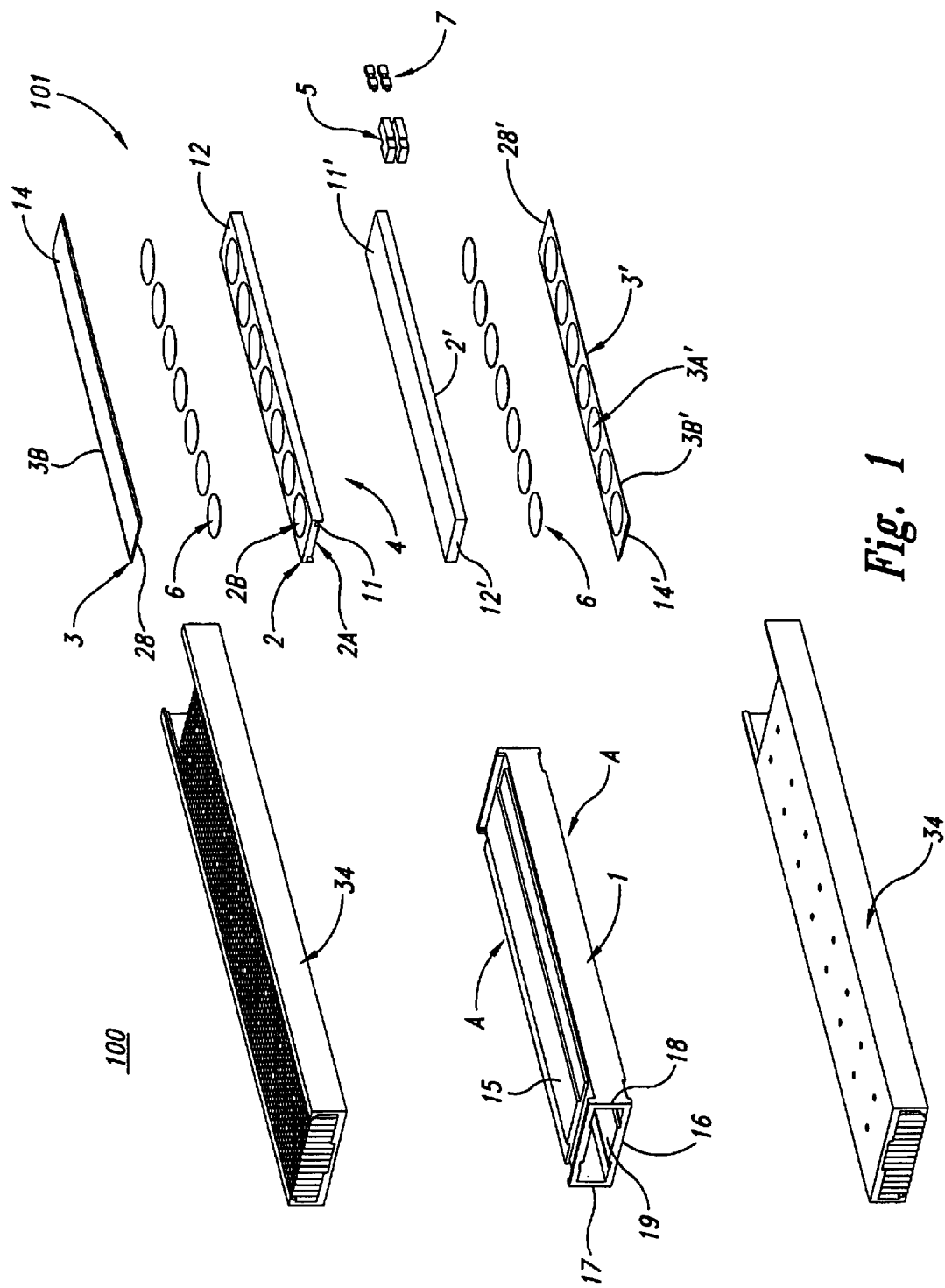
FIG. 1 is an exploded view of the components of a laser with a heat transfer system in accordance with a preferred embodiment of the present invention.
Figure 2:
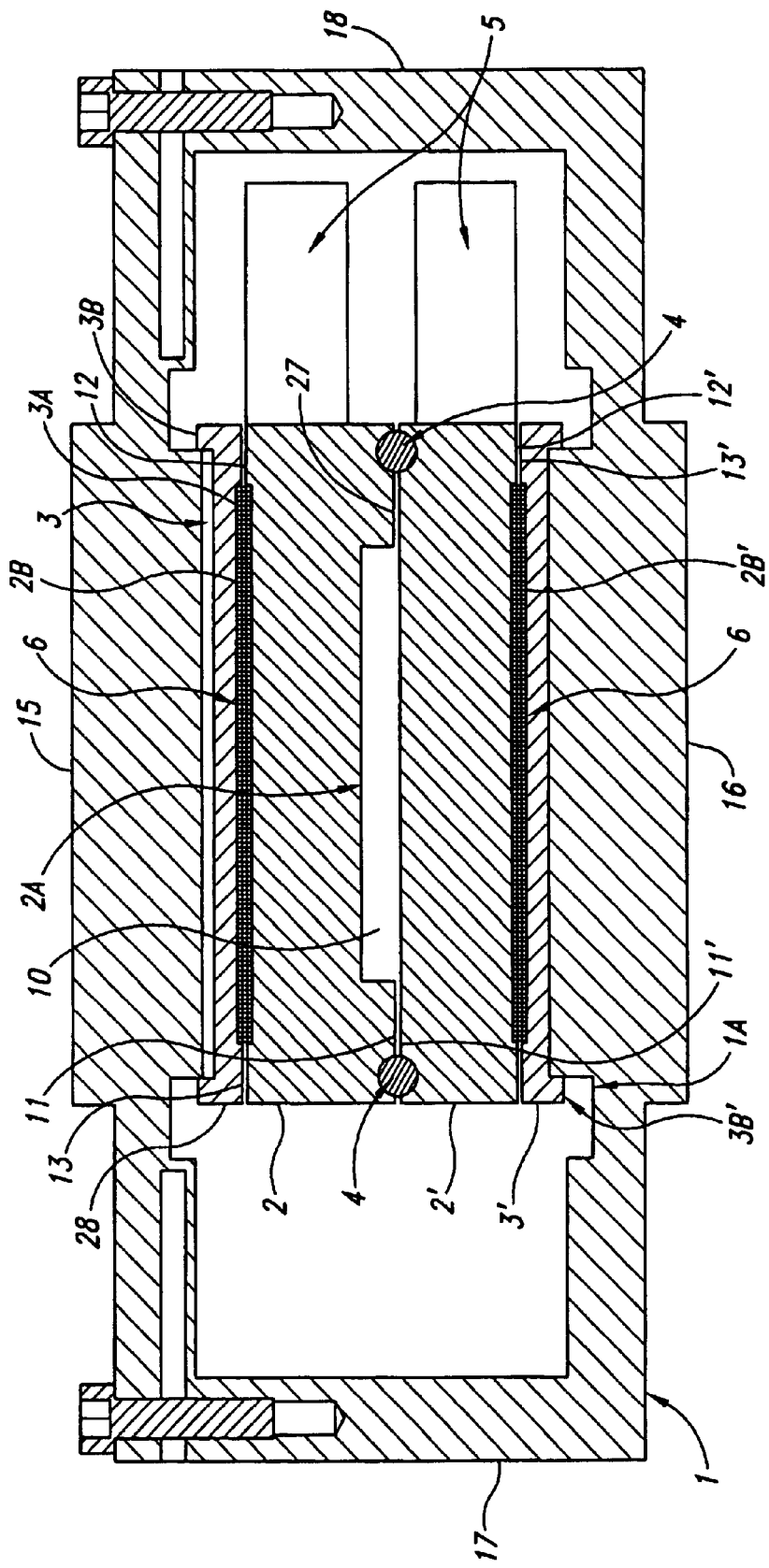
FIG. 2 is a cross-sectional view of the laser of FIG. 1, taken along line A-A.

In accordance with advantageous aspects of the present invention, a preferred embodiment thereof is found in a laser tube and electrode assembly for a sealed, RF excited, carbon dioxide laser with an integrated heat transfer system. The components of this laser 100 are shown in exploded form in FIG. 1 and in cross-section in FIG. 2. FIG. 2 represents the laser 100 in an "uncompressed" state, after the electrode assembly has been inserted into the tube but before the tube is compressed onto the electrode assembly, as will be described below.

The electrode assembly 101 includes first and second metal electrodes 2, 2'. Electrode 2 has an interior surface 11 and an exterior surface 12, with pockets 2B formed in the exterior surface 12. Disks 6, advantageously made from a dielectric material, are placed in the pockets 2B and extend slightly above the exterior surface 12. The dielectric material of the disks 6 has a thermal conductivity greater than that of the intended lasing medium. This dielectric material may be, for example, a ceramic. As will be understood from the description below, the disks 6 in combination function as a heat conducting, electrically insulating spacer that is positioned, in combination with a conformable spacer described below, to separate the first electrode 2 from the laser housing, which in this embodiment is the tube.

Electrode 2 also has a longitudinal groove 2A machined in its interior surface 11, centered in and running at least most of the length of the electrode 2.

Correspondingly, electrode 2' has an interior surface 11' and an exterior surface 12', with pockets 2B' (see FIG. 2) formed in the exterior surface 12'. Additional disks 6 made from the dielectric material are placed in the pockets 2B' and extend slightly above the exterior surface 12'. The disks 6' in combination function as another heat conducting, electrically insulating spacer that is positioned, in combination with a conformable spacer described below, to separate the second electrode 2' from the laser housing.

It will be understood that in other embodiments in accordance with the present invention, unitary heat conducting, electrically insulating spacers may be used in place of the multiple disks 6 or 6".

The electrodes 2, 2' are spaced apart using dielectric spacers 4 to electrically isolate them from each other and to form a gap 10 between them at the groove 2A. As shown in FIG. 1, the spacers 4 may advantageously be spheres that fit almost entirely into corresponding opposing depressions in the interior surfaces 11, 11'. Accordingly, there is a narrower gap 27 between the electrodes 2, 2' outside of the groove 2A.

In accordance with an advantageous feature of the present invention, a deformable metal spacer 3 having an interior surface 28 with pockets 3A (see FIG. 2) is placed over the dielectric disks 6 on the electrode 2, so that each disk 6 is held between a pocket 2B on the electrode 2 and a pocket 3A on the spacer 3. As shown in FIG. 2, the disks 6 are sized so that in the uncompressed state the interior surface 28 of the spacer 3 is initially held with a small gap 13 from the exterior surface 12 of the electrode 2. The spacer 3 further has an exterior surface 14 with flanges 3B running the length of the spacer 3 and projecting outwardly from the exterior surface 14.

Correspondingly, a deformable metal spacer 3' having an interior surface 28' with pockets 3A' is placed over the dielectric disks 6 on the electrode 2', so that each disk 6 is held between a pocket 2B' on the electrode 2' and a pocket 3A' on the spacer 3'. As shown in FIG. 2, the disks 6 are sized so that the interior surface 28' of the spacer 3' is initially held with a small gap 13' from the exterior surface 12' of the electrode 2'. The spacer 3' further has an exterior surface 14' (see FIG. 1) with flanges 3B' running the length of the spacer 3' and projecting outwardly from the exterior surface 14'.

The above-described elements are formed into a vertical electrode assembly 101, from spacer 3 on top to spacer 3' on the bottom, in the order shown in FIG. 1. To assemble the laser 100, this assembly 101 is inserted into an extruded metal tube 1, advantageously formed of a metal alloy, which serves as the housing of the laser 100. The tube 1 is generally rectangular in cross-section, with an upper wall 15, a lower wall 16 and left and right side walls 17, 18 defining a housing cavity 19 therein that is sized to contain the electrode assembly 101. During operation, the lasing medium fills the cavity 19, and in particular the gap 10 between the electrodes 2, 2'. Heat sinks 34 are provided at the upper and lower walls 15, 16 for disposing of the heat conveyed thereto in accordance with the present invention. The structure of tube 1 will be explained in more detail with reference to FIG. 3, which is identical to FIG. 2 except for the addition of certain reference numerals and the deletion of certain others.

Figure 3:
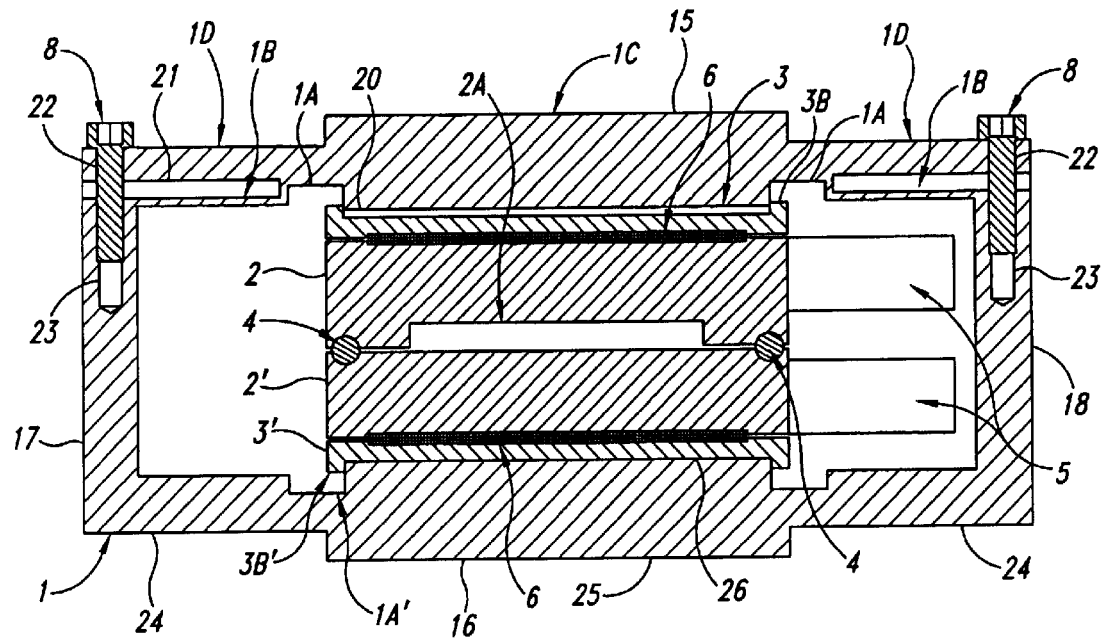
FIG. 3 is the same cross-sectional view of the laser as FIG. 2, with different reference numerals, illustrating the laser in an uncompressed state.

As shown in FIG. 3, the upper wall 15 of the tube 1 is a symmetrical composite of a number of wall portions. These include left and right outer flanges 1D with central wall portion 1C therebetween. The central wall portion 1C has an interior surface 20 and is made thick enough to provide sufficient rigidity under stress to provide even pressure on the facing spacer 3 when the tube 1 is in its compressed state, as described below.

The flanges 1D are thinner than the central wall portion 1C, but still thick enough to provide mechanical strength and stability. In accordance with an advantageous aspect of the present invention, a second outer flange is provided in the form of a thin wall 1B underneath each flange 1D with a gap 21 therebetween. Advantageously, each flange 1D and its partner thin wall 1B may be manufactured by extruding the upper wall 15 with thick outer extensions and then machining the gap 21 to create the two elements.

Screw holes 22 and 23 are made at intervals along the length of the tube 1 in the flanges 1D and the side walls 17, 18, respectively, in order to accommodate screws 8 for compressing the tube 1.

The lower wall 16 is substantially identical to the upper wall 15 except that no gap is machined in the left and right outer extensions 24 to create flanges/thin walls, and no screw holes are made. The central wall portion 25 of the lower wall 16 has an interior surface 26 and is made thick enough to provide sufficient rigidity under stress to provide even pressure on the facing spacer 3' when the tube 1 is in its compressed state.

Between each thin wall 1B and the central wall portion 1C, the upper wall 15 forms two grooves 1A that respectively align with the flanges 3B on the spacer 3 when the electrode assembly 101 is inserted in the tube 1. The lower wall 16 correspondingly has two grooves 1A' on either side of the central wall portion 25 that respectively align with the flanges 3B' on the spacer 3'.

The groove/flange combination serves to properly locate the electrode assembly 101 in the tube 1. Specifically, the electrode assembly 101 is prevented by the groove/flange combination from shifting laterally, so that the electrode assembly 101 will remain aligned with optics at the ends of the tube and will not come into contact with two or more walls of the tube, which would create a short circuit.

As noted above, the spacers 3, 3' are deformable, and will provide good surface contact between the electrical assembly 101 and the tube 1 for efficient heat transfer to maintain the desired operating temperature. The spacers 3, 3' are therefore termed conformable spacers, since they conform to the interior surfaces 20, 26 of the tube 1 and the exterior surfaces 12, 12' of the electrodes 2, 2' (see FIG. 1), as will be described. In addition, the design of the tube 1 makes the tube 1 deformable and allows the tube 1 to be compressed around the electrode assembly 101 to ultimately compress the electrode assembly 101, to further enhance this good surface contact.

Thus, the tube 1 is manufactured first by extrusion and then by machining the extrusion to form the gaps 21 creating the thin walls 1B. The thin walls 1B are thin enough so that they can be bent under the compressive force applied when the screws 8 are tightened in the screw holes.

Figure 4:
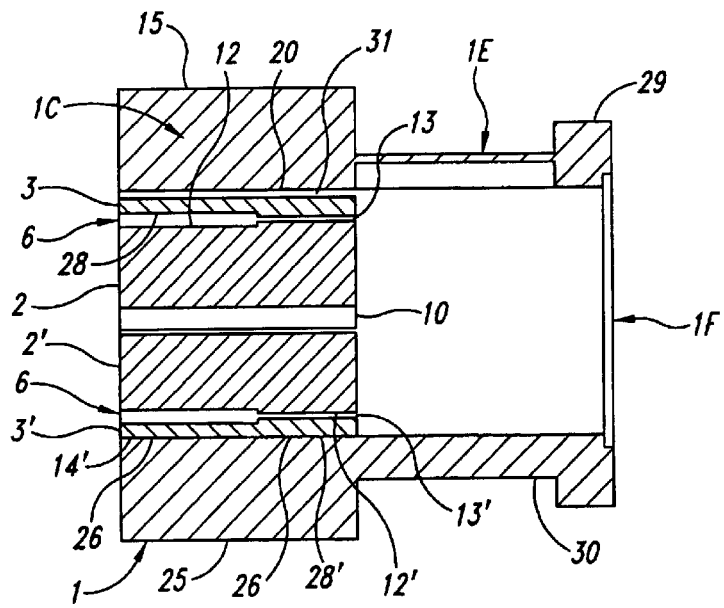
FIG. 4 is a cross-sectional view of an end of the laser of FIG. 1, taken perpendicular to the view of FIG. 2, illustrating the laser in the uncompressed state.

FIGS. 3 and 4 show the tube 1 with the electrode assembly 101 therein in the uncompressed state, i.e. where the laser has been fully assembled but the screws 8 have not yet been fully tightened and therefore are not yet exerting compressive force. FIG. 3 is a cross-section in the middle of the tube 1 and FIG. 4 is a partial cross-section perpendicular to that of FIG. 3 and at one end 29 of the tube 1.

As shown in FIG. 4, the upper wall 15 has a deformable thin wall 1E at end 29 extending in the direction perpendicular to thin wall 1B. Thin wall 1E may also be created by machining. therebetween. The electrode 2 is supported on the electrode 2' by the spacers 4, with the groove 2A forming the gap 10 between the two electrodes 2, 2' wherein the lasing medium is effective during operation. The spacer 3 is on top of the electrode 2, but the interior surface 28 of the spacer 3 is spaced slightly above the exterior surface 12 of the electrode 2 by the disks 6, separated by the gap 13. The flanges 3A of the spacer 3 are in the grooves 1A and flank the central wall portion 1D. In this state, a gap 31 still remains between the exterior surface 14 of the spacer 3 and the interior surface of the central wall portion 1C.

Figure 5:
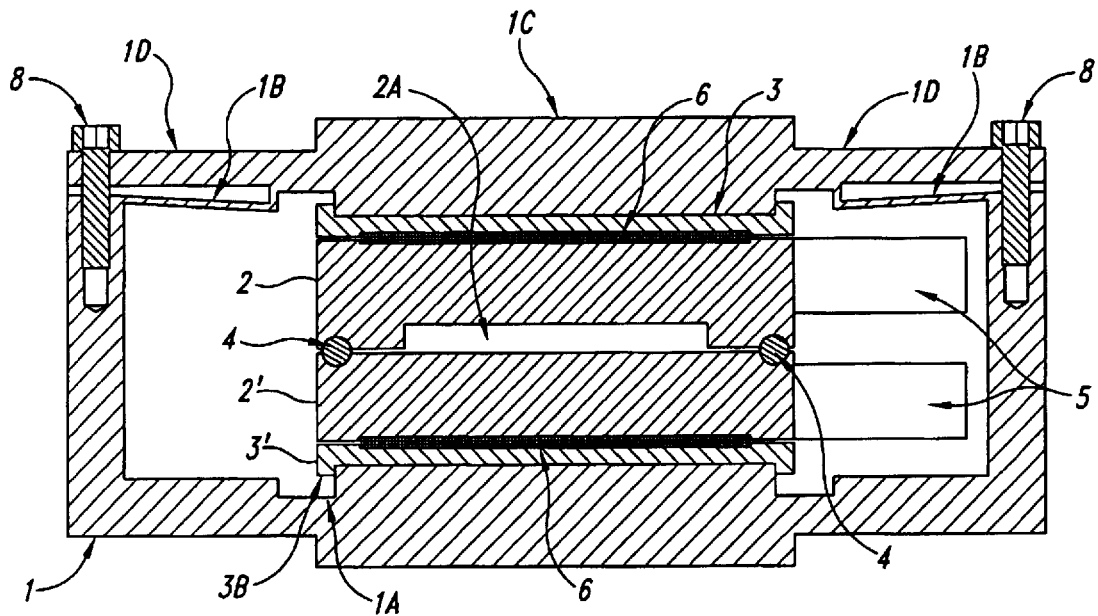
FIG. 5 is a cross-sectional view of the laser corresponding to FIG. 3, illustrating the laser in a compressed state.
Figure 6:
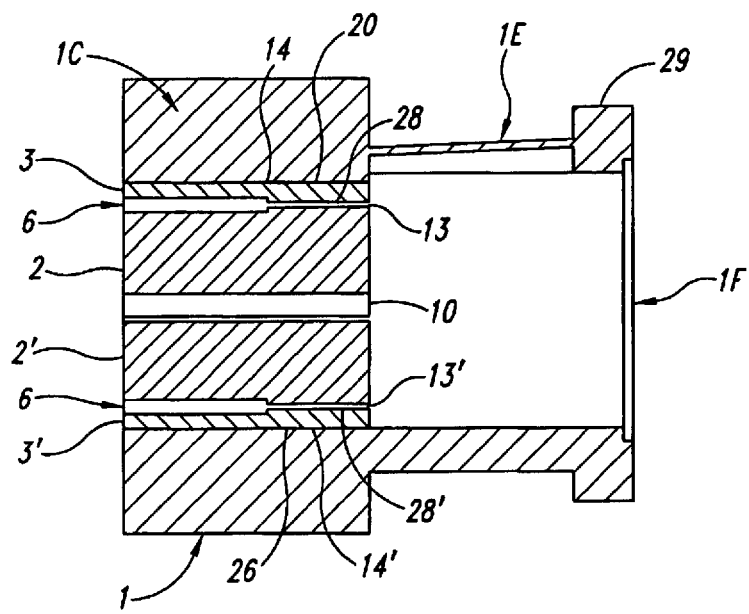
FIG. 6 is a cross-sectional view of the laser corresponding to FIG. 4, illustrating the laser in the compressed state.

FIG. 5 corresponds to FIG. 3, and FIG. 6 to FIG. 4, each illustrating the laser 100 in its compressed state, achieved by turning the screws 8 further.

As the screws 8 are tightened to a predetermined torque value, they will cause the flanges 1D to bend to apply a permanent compressive force on the electrode assembly 101. This force causes the conformable spacers 3, 3' to conform to both the interior surfaces 20, 26 of the tube 1 and the exterior surfaces of the electrodes 2, 2', encapsulating the dielectric disks 6. This provides the good surface contact between the various parts of the laser 100.

The thin walls 1E perpendicular to the thin walls 1B allow the center wall portion 1C to be brought into contact with the electrode assembly 101 without deforming the ends 29, 32 of the tube 1. This in turn allows end caps with optics (not illustrated) to be located in pockets 1F in the ends 29, 32 of the tube 1 and then welded into place to seal off the tube 1 and form a laser resonator. The gaps 13, 13' remain to electrically isolate the electrodes 2, 2' from the spacers 3, 3'.

In operation in accordance with known practice, the sealed tube 1 is evacuated to form a vacuum inside which is then filled with a mixture of carbon dioxide and other gases. The electrodes 2, 2' are attached to an RF power source (not illustrated) through RF feeds 7 on RF feed mounting blocks 5.

When the electrodes 2, 2' are energized, a plasma forms in the gap 10 between the electrodes 2, 2'. The heat generated in the plasma is transferred to the electrodes 2, 2'. From the electrodes 2, 2', the heat is drawn through the dielectric disks 6, 6' to the spacers 3, 3' and then to the central portions 17, 17' of the upper and lower surfaces of the tube 1. The heat is drawn from the outside of the tube 1 into the heat sinks 34, where it is dissipated to the atmosphere by, for example, a fan blowing air across the heat sink fins. An alternative configuration could employ a water cooled jacket in place of the air cooled heat sink fins to dissipate heat from the tube walls.

This design of the tube 1 provides many advantages. First, the extruded tube with minimal machining provides both features to locate the electrode assembly 101 in the tube 1 to maintain proper alignment with the optics and a means to deform the tube to compress the electrode assembly and maintain uniform good surface contact for efficient heat transfer. This method does not rely on the material strength or temper of the tube walls to compress the electrode assembly, allowing the tube to be manufactured from a greater variety of materials.

This design also provides thin walls for deformation of the tube to compress the electrode assembly while allowing the tube walls to be much thicker along the contact areas between the tube and the electrode assembly, i.e. at the center wall portions 1C, 25. Therefore, while the thin walls deform, the thicker walled contact areas stay flat for good surface contact. Moreover, these contact areas are of substantially the same size, so that the cooling is symmetrical from top and bottom and will therefore not cause distortions.

Contrary to the prior art described above, in this design atmospheric pressure does not play a part in maintaining the compressive force on the electrode assembly, so altitude does not effect the performance of the design.

Similarly, only one side (the upper wall) of the tube is required to deform, allowing the opposite side to be used as a reference surface for aligning the optics to the electrodes.

Moreover, no special tooling is required to assemble the tube.

The present invention as embodied in the above-described laser is additionally highly advantageous as compared with the prior art by virtue of the intermediate conformable spacers 3, 3' between the dielectric disks 6, 6' and the inner surfaces of the tube walls. These spacers 3, 3' are additional elements that provide a number of benefits.

First, the spacers 3, 3' can deform and flex to accommodate surface roughness and imperfections as well as bows or twists in the tube walls. This is in contrast to the dielectric material layers or pieces in the prior art that were subject to cracking under pressure or stress. This reduces the need for machined surfaces for good thermal contact between the electrodes, dielectric material and tube walls.

The conformable spacers 3, 3' also allow the tube extrusion to be thicker and stronger, since the spacers will deform for good surface contact rather than the tube walls. A stronger tube can more reliably keep the optics in alignment.

The conformable spacers 3, 3' also allow for the use of fewer and larger pieces of dielectric material, since the possibility of cracking of the dielectric material is reduced. Fewer and larger pieces of dielectric material reduce the cost and complexity of the design.

In addition, the surfaces of the spacers 3, 3' can be readily machined, unlike the inside walls of the tube. This allows for the machining of the pockets 3B, 3B' to help capture the dielectric pieces and hold the electrodes 2, 2' in place. The flanges 3B, 3B' are also readily machined to position the whole electrode assembly 101 inside the tube 1.

The above-discussed embodiment of the present invention maintains both electrodes out of electrical contact with the walls of the tube. However, it is possible for one of the electrodes to be electrically insulated from the walls and the other electrode to be grounded to the walls. For symmetric heat transfer, the dielectric material used for electrical insulation could be replaced at the grounded electrode with smaller elements of aluminum to balance the differential in thermal conductivity between the two materials. Other electrically conductive materials could be used, with a corresponding adaptation for symmetry.

While the above-described embodiment is a carbon dioxide laser, it will be apparent to those of ordinary skill in the art that other types of lasers may advantageously employ the present invention.

It is also noted that the dielectric material can be provided in other shapes than disks and in other formats. For example, the dielectric material could be deposited as a coating onto the exterior surface of each electrode, onto the interior surfaces of the walls of the tube, or onto one of each or both. This could be done by, for example, anodizing, flame spraying or plasma spraying. The coating or coatings would be used in conjunction with the conformable spacers in the same manner as the ceramic (dielectric) elements.

In other embodiments, one, some or all of the elements made of a dielectric material may be made of another suitably insulative, heat conducting material such as a semiconducting material, for example, silicon, germanium and gallium arsenide. In such embodiments, if a voltage were applied across the semiconductor in the right direction, the semiconductor would act as an insulator.

Figure 7:
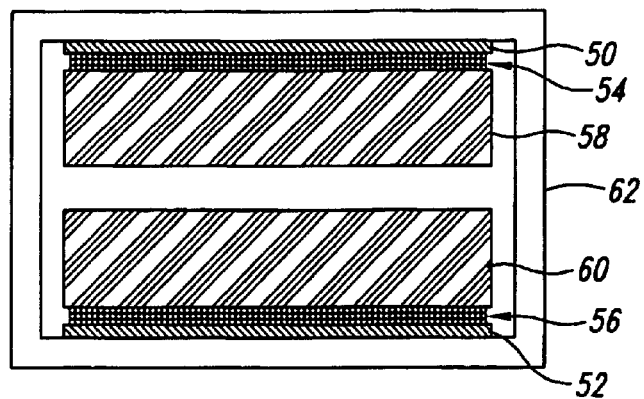
FIG. 7 is a cross-sectional view of the laser of FIG. 1 illustrating the vertical arrangement of the electrodes and spacers.

In accordance with a further development of the present invention, the arrangement of spacers can be varied in accordance with a desired application. FIG. 7 illustrates the arrangement of conformable spacers 50, 52 and heat conducting, electrically insulating spacers 54, 56 with electrodes 58, 60 in a housing 62 that generally conforms to the arrangement shown in FIG. 1. That is, the interior surface of the insulating spacer 54 is in contact with the exterior surface of the electrode 58, the exterior surface of the insulating spacer 54 is in contact with the interior surface of the conformable spacer 50, and the exterior surface of the conformable spacer 50 is in contact with the top interior surface of the housing 62. The same arrangement applies to the conformable spacer 52, the insulating spacer 56, the electrode 60 and the lower interior surface of the housing 62.

Figure 8:
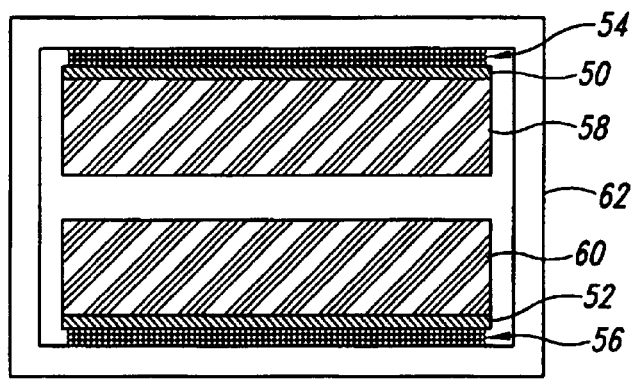
FIG. 8 is a cross-sectional view of another laser in accordance with the present invention illustrating an alternative vertical arrangement of electrodes and spacers.

FIG. 8 illustrates another embodiment with a different arrangement of spacers. In this embodiment, the positions of the conformable spacers and the insulating spacers are reversed. Thus, the interior surface of the conformable spacer 50 is in contact with the exterior surface of the electrode 58, the exterior surface of the conformable spacer 50 is in contact with the interior surface of the insulating spacer 54, and the exterior surface of the insulating spacer 54 is in contact with the top interior surface of the housing 62. The same arrangement applies to the conformable spacer 52, the insulating spacer 56, the electrode 60 and the lower interior surface of the housing 62.

Figure 9:
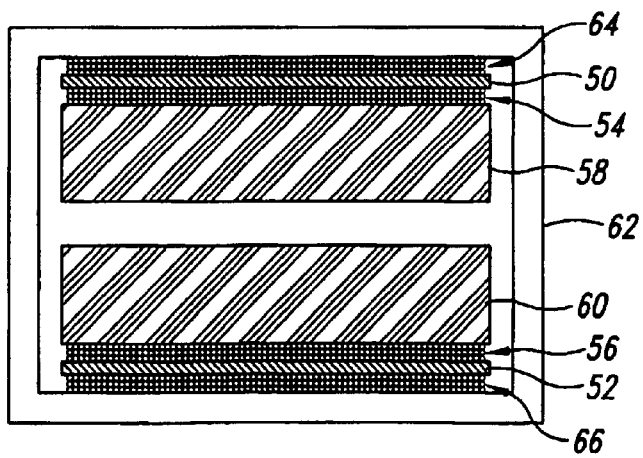
FIG. 9 is a cross-sectional view of still another laser in accordance with the present invention illustrating a second alternative vertical arrangement of electrodes and spacers.

FIG. 9 illustrates yet another embodiment that combines features of the embodiments of FIGS. 7 and 8 by providing a third spacer, i.e. another insulating spacer, between each electrode and the housing. That is, the interior surface of the insulating spacer 54 is in contact with the exterior surface of the electrode 58, the exterior surface of the insulating spacer 54 is in contact with the interior surface of the conformable spacer 50, the exterior surface of the conformable spacer 50 is in contact with the interior surface of the insulating spacer 64 and the exterior surface of the insulating spacer 64 is in contact with the top interior surface of the housing 62. The same arrangement applies to the conformable spacer 52, the insulating spacers 56 and 66, the electrode 60 and the lower interior surface of the housing 62.

The different arrangements of spacers may be combined in any appropriate way in a single embodiment, so that the upper and lower electrodes each independently have any one of the three spacer arrangements.

While the disclosed method and apparatus has been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A laser comprising:
   a housing having a housing cavity therein;
   first and second electrodes in said housing cavity defining a lasing volume therebetween;
   a lasing medium in said lasing volume;
   at least one heat conducting, electrically insulating spacer in said housing cavity including a first spacer; and
   at least one conformable spacer in said housing cavity including a second spacer,
   said first and second spacers being positioned in said housing cavity to separate said first electrode from said housing, wherein said second spacer is positioned between said first spacer and a portion of said housing.

2. A laser comprising:
   a housing having a housing cavity therein;
   first and second electrodes in said housing cavity defining a lasing volume therebetween;
   a lasing medium in said lasing volume;
   at least one heat conducting, electrically insulating spacer in said housing cavity including a first spacer; and
   at least one conformable spacer in said housing cavity including a second spacer,
   said first and second spacers being positioned in said housing cavity to separate said first electrode from said housing, wherein said first spacer is between said second spacer and a portion of said housing.

3. A laser comprising:
   a housing having a housing cavity therein;
   first and second electrodes in said housing cavity defining a lasing volume therebetween;
   a lasing medium in said lasing volume;
   at least one heat conducting, electrically insulating spacer in said housing cavity including a first spacer; and
   at least one conformable spacer in said housing cavity including a second spacer,
   said first and second spacers being positioned in said housing cavity to separate said first electrode from said housing, wherein;
   each of said first and second electrodes has an interior surface and an exterior surface;
   said lasing medium is between said interior surfaces of said first and second electrodes;
   said housing cavity has an interior surface;
   one of said first and second spacers is in contact with said exterior surface of said first electrode and the other of said first and second spacers is out of contact with said first electrode and in contact with said one of said first and second spacers; and
   said first and second spacers separate said first electrode from said interior surface of said housing cavity.

4. The laser of claim 3, wherein said at least one heat conducting, electrically insulating spacer includes a third spacer, said third spacer being positioned between said second spacer and a portion of said housing and said first spacer being positioned between said second spacer and said first electrode.

5. The laser of claim 3, wherein each said at least one heat conducting, electrically insulating spacer is formed of selected one of a dielectric material and a semiconducting material.

6. The laser of claim 3, wherein each said comformable spacer is formed of an easily deformable metal.

7. The laser of claim 6, wherein each said conformable spacer is formed of pure aluminum.

8. The laser of claim 3, wherein said first spacer is in contact with said exterior surface of said first electrode and said second spacer is in contact with said first spacer.

9. The laser of claim 8, wherein each of said first and second spacers has respective interior and exterior surfaces, wherein said interior surface of said first spacer is in contact with said exterior surface of said first electrode, said exterior surface of said first spacer is in contact with said interior surface of said second spacer, and said exterior surface of said second spacer is in contact with said first interior surface of said housing cavity,
whereby during operation of said laser, heat is conducted from said lasing medium through said first electrode and said first and second spacers to said first interior surface of said housing cavity to maintain an acceptable operating temperature of said lasing medium.

10. The laser of claim 8, wherein said at least one heat conducting, electrically insulating spacer includes a third spacer, wherein each of said first, second and third spacers has respective interior and exterior surfaces, wherein said interior surface of said first spacer is in contact with said exterior surface of said first electrode, said exterior surface of said first spacer is in contact with said interior surface of said second spacer, said exterior surface of said second spacer is in contact with said interior surface of said third spacer and said exterior surface of said third spacer is in contact with said first interior surface of said housing cavity,
whereby during operation of said laser, heat is conducted from said lasing medium through said first electrode and said first, second and third spacers to said first interior surface of said housing cavity to maintain an acceptable operating temperature of said lasing medium.

11. The laser of claim 3, wherein said second spacer is in contact with said exterior surface of said electrode and said first spacer is in contact with said second spacer.

12. The laser of claim 11, wherein each of said first and second spacers has respective interior and exterior surfaces, wherein said interior surface of said second spacer is in contact with said exterior surface of said first electrode, said exterior surface of said second spacer is in contact with said interior surface of said first spacer, and said exterior surface of said first spacer is in contact with said first interior surface of said housing cavity,
whereby during operation of said laser, heat is conducted from said lasing medium through said first electrode and said second and first spacers to said first interior surface of said housing cavity to maintain an acceptable operating temperature of said lasing medium.

13. The laser of claim 3, wherein said housing is collapsible and said housing includes a compression structure for selectively collapsing said housing to deform said second spacer into making respective surface contact with surfaces adjacent thereto, and wherein said interior surface of said housing cavity is provided on a wall of said housing having a thickness sufficient to prevent deformation of said housing under compression of said second spacer.

14. The laser of claim 3, wherein said housing is collapsible.

15. The laser of claim 14, wherein said housing includes a compression structure for selectively collapsing said housing to deform said second spacer into making respective surface contact with surfaces adjacent thereto.

16. The laser of claim 14, wherein: said housing has opposing first and second walls, said first wall including a relatively thick first wall portion with an interior surface, said second wall including a relatively thick second wall portion, and said first wall further including a relatively thin third wall portion extending from said first wall portion;
said housing further having a compression structure for exerting compressive force on said first wall, the compressive force being sufficient to deform said thin third wall portion without deforming said first and second wall portions and thereby bring said interior surface of said first wall portion into heat transfer relation with said first electrode through said first and second spacers for efficient heat transfer, the heat transfer relation continuing during operation of said laser.

17. The laser of claim 16, wherein the compressive force selectively collapses said housing to deform said second spacer into making respective surface contact with surfaces adjacent thereto.

18. The laser of claim 3, wherein said first spacer comprises at least one ceramic element.

19. The laser of claim 3, wherein said first spacer comprises at least one ceramic-coated element.

20. A method for constructing a laser, comprising the steps of:
providing a housing having a housing cavity therein;
providing first and second electrodes in the housing cavity to define a lasing volume therebetween;
providing a lasing medium in the lasing volume;
providing at least one heat conducting, electrically insulating spacer in the housing cavity including a first spacer;
providing at least one conformable spacer in the housing cavity including a second spacer; and
positioning the first and second spacers in the housing cavity to separate at least the first electrode from the housing, wherein said positioning step positions the second spacer between the first spacer and a portion of the housing.

21. A method for constructing a laser, comprising the steps of:
providing a housing having a housing cavity therein;
providing first and second electrodes in the housing cavity to define a lasing volume therebetween;
providing a lasing medium in the lasing volume;
providing at least one heat conducting, electrically insulating spacer in the housing cavity including a first spacer;
providing at least one conformable spacer in the housing cavity including a second spacer; and
positioning the first and second spacers in the housing cavity to separate at least the first electrode from the housing, wherein said positioning step positions the first spacer between the second spacer and a portion of the housing.

22. A method for constructing a laser, comprising the steps of;
providing a housing having a housing cavity therein;
providing first and second electrodes in the housing cavity to define a lasing volume therebetween;
providing a lasing medium in the lasing volume;
providing at least one heat conducting, electrically insulating spacer in the housing cavity including a first spacer;

providing at least one conformable spacer in the housing cavity including a second spacer; and positioning the first and second spacers in the housing cavity to separate at least the first electrode from the housing, wherein an interior one of the first and second spacers is in contact with the first electrode and the other of the first and second spacers is out of contact with the first electrode and in contact with the interior one of the first and second spacers, whereby during operation of the laser, heat is conducted from the lasing medium through the first electrode and the first and second spacers to the housing to maintain an acceptable operating temperature of the lasing medium.

23. The method of claim 22, wherein the at least one heat conducting, electrically insulating spacer includes a third spacer, said positioning step positioning the third spacer between the second spacer and a portion of the housing and positioning the first spacer between the second spacer and the first electrode.

24. The method of claim 22, wherein each conformable spacer is formed of an easily deformable metal.

25. The method of claim 24, wherein each conformable spacer is formed of pure aluminum.

26. The method of claim 22, wherein the housing is collapsible, and said method further comprises the step of providing the housing with a compression structure for selectively collapsing the housing to deform the second spacer into making respective surface contact with surfaces adjacent thereto.

27. The method of claim 26, wherein an interior surface of the housing cavity directly facing any of the spacers is provided on a wall of the housing having a thickness sufficient to prevent deformation of the housing under compression of the second spacer.

28. A laser comprising;
a housing having wall portions including a first wall portion and a second wall portion, wherein the wall portions define a cavity;
a first electrode having a first exterior facing the first wall portion and first interior surface;
a second electrode having second exterior surface facing the second wall portion and a second interior surface juxtaposed to the first interior surface of the first electrode;
a spacer set having a heat conducting, electrically insulating first spacer and a conformable second spacer, wherein the first and second spacers are located between the first exterior surface of the first electrode and the first wall portion of the housing.

29. The laser of claim 28 wherein the first spacer contacts the first exterior surface of the first electrode.

30. The laser of claim 28 wherein the first spacer contacts the first exterior surface of the first electrode and the second spacer contacts the first wall portion.

31. The laser of claim 28 wherein the second spacer contacts the first exterior surface of the first electrode.

32. The laser of claim 28 wherein the second spacer contacts the first exterior surface of the first electrode and the first spacer contacts the first wall portion.

33. The laser of claim 28 wherein the spacer set further comprises a heat conducting, electrically insulating third spacer located between the first exterior surface of the first electrode and the first wall portion of the housing.

34. The laser of claim 33 wherein the first spacer faces the first exterior surface of the first electrode, the second spacer faces the first wall portion, and the third spacer is between the first and second spacers.

35. The laser of claim 28 wherein the first wall portion comprises a central portion, flange portions extending from the central portion, and flexible portions spaced apart from corresponding flange portions, wherein the first and second spacers are aligned with the central portion.

36. The laser of claim 35 wherein the flexible portions are configured to flex as the flange portions are driven toward the flexible portions to compress the first and second spacers between the central portion of the first wall portion and the first exterior surface of the first electrode.

* * * * *